US011875368B2

(12) United States Patent
Kansara et al.

(10) Patent No.: US 11,875,368 B2
(45) Date of Patent: Jan. 16, 2024

(54) PROACTIVELY PREDICTING TRANSACTION QUANTITY BASED ON SPARSE TRANSACTION DATA

(71) Applicant: SAP SE, Walldorf (DE)

(72) Inventors: Pankti Jayesh Kansara, San Jose, CA (US); James Rapp, Denver, CO (US); John Seeburger, Mountain View, CA (US); Sangeetha Krishnamoorthy, Sunnyvale, CA (US); Mario Ponce Midence, Livermore, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/810,465

(22) Filed: Mar. 5, 2020

(65) Prior Publication Data

US 2021/0117995 A1    Apr. 22, 2021

Related U.S. Application Data

(60) Provisional application No. 62/924,618, filed on Oct. 22, 2019.

(51) Int. Cl.
*G06Q 30/0202*    (2023.01)
*G06Q 30/0601*    (2023.01)
(Continued)

(52) U.S. Cl.
CPC ........... *G06Q 30/0202* (2013.01); *G06N 7/01* (2023.01); *G06N 20/00* (2019.01); *G06Q 10/047* (2013.01);
(Continued)

(58) Field of Classification Search
CPC .............................. G06Q 30/0202; G06F 17/18
(Continued)

(56) References Cited

U.S. PATENT DOCUMENTS 8,090,614 B2    1/2012    Ford et al.
10,235,430 B2    3/2019    N et al.
(Continued)

FOREIGN PATENT DOCUMENTS

WO    WO 03/048901    6/2003

OTHER PUBLICATIONS

"Association and Classification Analysis in Retail Case Study" to Kopap et al., Oct. 29, 2013 (Year: 2013).*
(Continued)

*Primary Examiner* — Charles Guiliano
*Assistant Examiner* — Po Han Lee
(74) *Attorney, Agent, or Firm* — Fish & Richardson P.C.

(57) ABSTRACT

The present disclosure involves systems, software, and computer implemented methods for proactively predicting demand based on sparse transaction data. One example method includes receiving a request to predict transaction quantities for a plurality of transaction entities for a future time period. Historical transaction data for the transaction entities is identified for a plurality of categories of transacted items. The plurality of categories are organized using a hierarchy of levels. Multiple levels of the hierarchy are iterated over starting at a lowest level. For each current level in the iteration, features to include in a quantity forecasting model for the current level are identified. The quantity forecasting model is trained using the identified features. Predicted transaction dates are predicted for the current level by a transaction date prediction model. The quantity forecasting model is used to generate predicted quantity information for the current level for the predicted transaction dates.

19 Claims, 10 Drawing Sheets

(51) Int. Cl.
*G06N 20/00* (2019.01)
*G06Q 10/047* (2023.01)
*G06Q 10/1093* (2023.01)
*G06N 7/01* (2023.01)

(52) U.S. Cl.
CPC ..... *G06Q 10/1093* (2013.01); *G06Q 30/0605* (2013.01)

(58) Field of Classification Search
USPC ........................................ 705/7.31
See application file for complete search history.

(56) References Cited

U.S. PATENT DOCUMENTS

| | | | | |
|---|---|---|---|---|
| 10,878,354 | B1* | 12/2020 | Zbikowski | G06Q 10/06315 |
| 2008/0140515 | A1* | 6/2008 | Godwin | G06Q 30/0205 |
| | | | | 705/7.24 |
| 2009/0006156 | A1* | 1/2009 | Hunt | G06Q 30/02 |
| | | | | 705/7.11 |
| 2010/0280927 | A1 | 11/2010 | Faith et al. | |
| 2014/0108209 | A1* | 4/2014 | Lo Faro | G06Q 40/02 |
| | | | | 705/30 |
| 2014/0222506 | A1* | 8/2014 | Frazer | G06Q 30/02 |
| | | | | 705/7.29 |
| 2016/0134723 | A1* | 5/2016 | Gupta | H04L 67/2828 |
| | | | | 709/247 |
| 2017/0039498 | A1 | 2/2017 | Vasgaard et al. | |
| 2018/0138921 | A1* | 5/2018 | Arelakis | H03M 7/30 |
| 2018/0268003 | A1* | 9/2018 | Barsness | G06F 16/24568 |
| 2018/0365755 | A1* | 12/2018 | Bekbolatov | G06Q 30/0603 |
| 2019/0228461 | A1* | 7/2019 | Domokos | G06Q 30/0613 |
| 2019/0259043 | A1 | 8/2019 | Koneri et al. | |
| 2020/0005192 | A1 | 1/2020 | Kumar et al. | |
| 2020/0184494 | A1* | 6/2020 | Joseph | G06K 9/6256 |
| 2021/0117839 | A1 | 4/2021 | Kulkarni et al. | |
| 2021/0117851 | A1* | 4/2021 | Jumper | G06N 20/00 |
| 2021/0117990 | A1 | 4/2021 | Jumper et al. | |

OTHER PUBLICATIONS

Hyndman et al., "Simple Exponential Smoothing" Forecasting: principles and practice. OTexts, May 8, 2018, 1 page.
Hyndman et al., "Some Simple Forecasting Methods", Forecasting: principles and practice. OTexts, May 8, 2018, 1 page.
Ke et al., "LightGBM: A highly efficient gradient boosting decision tree." Advances in neural information processing systems, 2017, 9 pages.
Wikipedia Contributors[Online], "F1 Score" available on or before Sep. 13, 2006, via internet archive: Wayback Machine URL <https://web.archive.org/web/20060913000000/https://en.wikipedia.org/wiki/F1_score>, [retrieved on Mar. 6, 2020], retrieved from: URL <https://en.wikipedia.org/wiki/F1_score>, 1 page.
Wikipedia Contributors[Online], "Random Search" available on or before Feb. 5, 2012, via internet archive: Wayback Machine URL <https://web.archive.org/web/20130205130936/https://en.wikipedia.org/wiki/Random_Search>, [retrieved on Mar. 6, 2020], retrieved from: URL <https://en.wikipedia.org/wiki/Random_search>, 3 pages.
Wikipedia Contributors[Online], "Zero Inflated model" available on or before Jul. 17, 2013, via internet archive: Wayback Machine URL <https://web.archive.org/web/20130717121825/https://en.wikipedia.org/wiki/Zero-inflated_model>, [retrieved on Mar. 6, 2020], retrieved from: URL <https://en.wikipedia.org/wiki/Zero-inflated_model>, 2 pages.
Giles, "Notes on the zero-inflated Poisson regression model." Department of Economics: University of Victoria, Mar. 2010, 4 pages.
Hadiji et al., "Poisson dependency networks: Gradient boosted models for multivariate count data." Machine Learning 100.2, Sep. 2015, 477-507, 31 pages.
Karaman, "Predicting Next Purchase Day" Towards Data Science, Jun. 2, 2019, 21 pages.
Non-Final Office Action issued in U.S. Appl. No. 16/810,443 dated May 18, 2022, 25 pages.
Non-Final Office Action issued in U.S. Appl. No. 16/810,443 dated Mar. 20, 2023, 9 pages.
Brighthubpm.com [online], "Kanban explained: How it works in the Just in Time (JIT) Process" May 2010, retrieved on Sep. 26, 2022, retrieved from URL <brighthubpm.com/monitoring-projects/70336-kanban-explained-as-applied-to-jit/>, 6 pages.
Final Office Action issued in U.S. Appl. No. 16/810,443 dated Dec. 1, 2022, 21 pages.
Linkedin.com [online], "Heuristic Automation in IT Infrastructure" Mar. 2015, retrieved on Aug. 18, 2023, retrieved from URL <https://www.linkedin.com/pulse/heuristic-automation-infrastructure-ramkumar-balasubramanian>, 31 pages.

* cited by examiner

PROACTIVELY PREDICTING TRANSACTION QUANTITY BASED ON SPARSE TRANSACTION DATA

TECHNICAL FIELD

The present disclosure relates to computer-implemented methods, software, and systems for proactively predicting demand based on sparse transaction data.

BACKGROUND

Retail stores can sell a variety of products. Some retail stores can receive products produced by a variety of producers. A retail store can arrange for delivery from certain producers or distributers, and can therefore interact with a variety of producers and/or distributers.

SUMMARY

The present disclosure involves systems, software, and computer implemented methods for proactively predicting demand based on sparse transaction data. An example method includes: receiving a request to predict transaction quantities for a plurality of transaction entities for a future time period; identifying historical transaction data for the transaction entities for a plurality of categories of transacted items, wherein the plurality of categories are organized using a hierarchy of levels; iterating over multiple levels of the hierarchy starting at a lowest level, wherein the iterating includes, for each current level in the iteration: identifying features to include in a quantity forecasting model for the current level; training the quantity forecasting model including building the identified features into the quantity forecasting model; identifying predicted transaction dates predicted for the current level by a transaction date prediction model; computing values for the features using the predicted transaction dates and the historical transaction data; and using the quantity forecasting model to generate predicted quantity information for the current level for the predicted transaction dates; aggregating predicted quantity information for multiple levels into aggregated quantity prediction information; and providing the aggregated quantity prediction information in response to the request.

Implementations may include one or more of the following features. A lowest level of the hierarchy can correspond to a transacted item. Higher levels of the hierarchy can correspond to more general categories of transacted items. The aggregated quantity prediction information can be aggregated with corresponding predicted transaction dates into an aggregated transaction date and quantity prediction. The aggregated transaction date and quantity prediction can include a transaction entity visit schedule for scheduling visits to transaction entities that are predicted to have certain transactions on certain dates an in certain quantities. At least one inclusion rule can be applied to the transaction entity visit schedule. The at least one inclusion rule can include a minimum visit rule or a minimum predicted transaction value rule. The predicted quantity information can include predicted transaction value and the method further comprises determining predicted number of units based on the predicted transaction value. The quantity forecasting model for the current level can be configured based on a particular base time period. The request can correspond to a date range that includes multiple instances of the base time period. Predicted quantity information can be separately generated for each instance of the time period. The predicted quantity information for instances that are earlier in the date range can be used when generating the predicted quantity information for instances that are later in the date range. The quantity forecasting model can be trained using promotion information that has been merged with the historical transaction data. The features can include promotion-related features. The features can include cumulative sum or expanding mean features.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
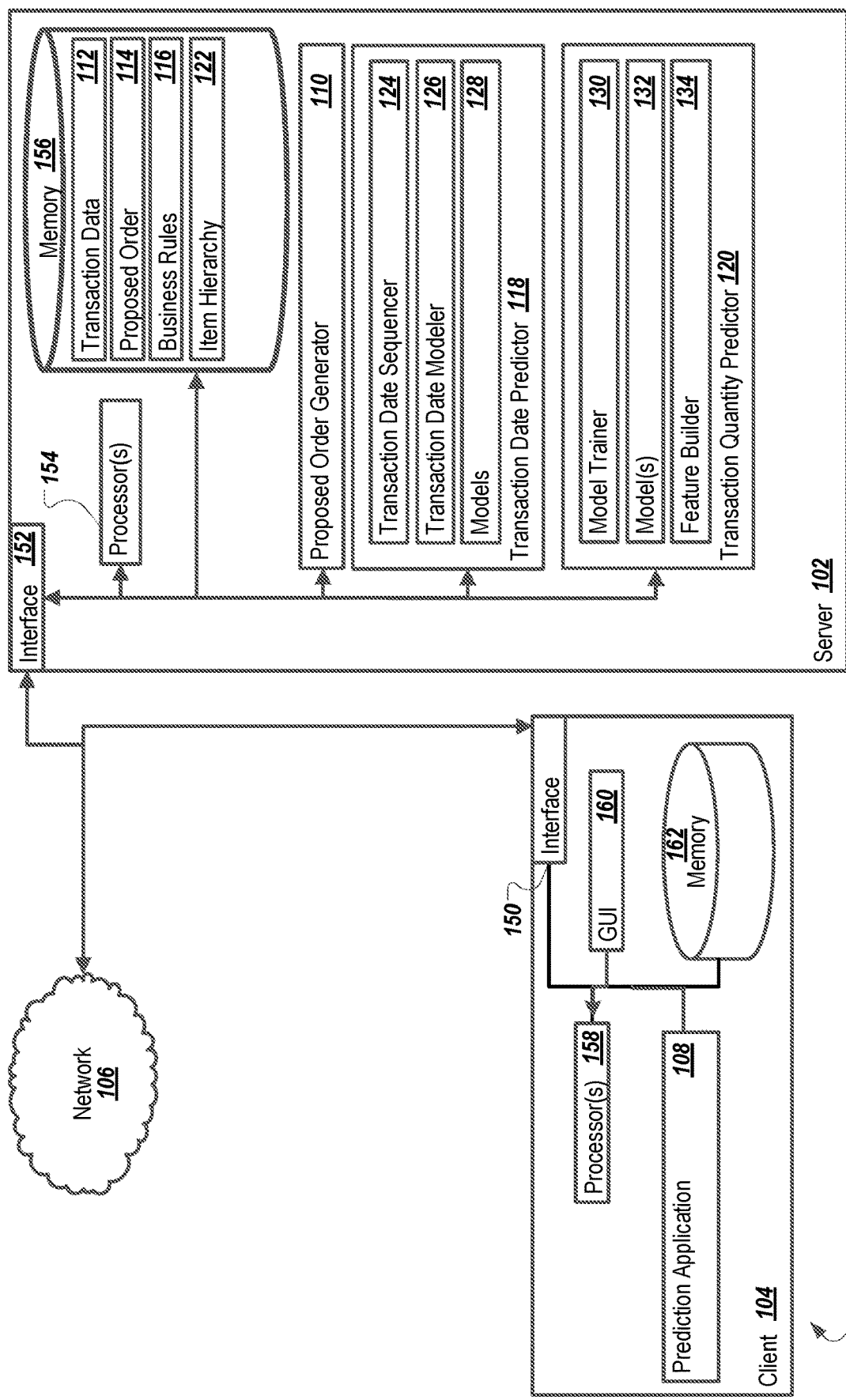
FIG. 1 is a block diagram illustrating an example system for proactively predicting demand based on sparse transaction data.

Businesses that sell products to retailers may rely on institutional knowledge or intuition to determine which retail stores salespeople are to visit to try and make a sale to retailers. Retail stores may be spread out geographically, for example. Other examples may involve a salesperson visiting every retail store to try and make a sale, such as based on a static visit schedule. A static visit schedule may direct a salesperson to visit each store on a periodic basis, such as every week, every other week, every month, or on some other schedule. Such prior solutions might not take into account knowledge of historical sales, current promotions or other business factors that may influence a retail store's decision to make a purchase. A salesperson visiting a retail store may either make a sale, which can be considered as a productive visit, or not make a sale, which can be considered as an unproductive visit. When visiting on a static schedule, a substantial number of visits may be unproductive visits.

Businesses may desire to employ strategies to increase a likelihood that a visit is a productive visit. In some cases, businesses may desire to seek improved ways to dynamically optimize salesperson routes when historical transaction data (e.g., purchases of the products by retailers) is sparse. A prediction system described herein can be used to proactively predict demand based on sparse transaction data, with the predicted demand being used, for example, to determine particular retailers to visit and at identified times. A dynamic schedule can result in increased productive visits and reduced unproductive visits. Accordingly, salespeople can spend more time doing productive tasks, as compared to deciding visits based on an unintelligent static schedule. As a result, resource use, including use of order tracking and other computing devices or systems, can be reduced.

The prediction system can generate estimates, that can be used, for example, for planning visits to geographically-dispersed retail locations, even when sales data is sparse. The prediction system can, for example, generate estimates, for each retailer and for each product, regarding when the retailer is predicted to buy the product and in what quantities. The prediction system can generate predictions even when the historical transaction data is sparsely populated at a retailer-product level. For example, the historical transaction data may not include entries for a substantial number of retailer-product pairs.

Data sparseness can occur when transaction history does not include a sufficient number of transactions for each desired level of granularity for which predictions are to be made. For instance, transaction data may not exist (or may not exist in sufficient amounts) for each product level (e.g., a product or a more general level) for each retailer for which an estimate is desired. For other time series based prediction systems, traditional time series based estimates can be made when sufficient transaction data exists. When data is sparse, the models and approaches described herein can be used.

The prediction system can use a two stage pipeline. In a first stage, product purchases and purchase dates can be estimated for each retailer. The first stage can include creation of a transaction date model (e.g., buy/no-buy model) for each retailer-product pair, based on purchasing history. For instance, a buy/no-buy model can be configured to consider purchase dates but not purchase quantities (e.g., quantities can be considered/estimated in the second stage of the pipeline). A buy-no-buy model can be made for retailer-product pairs and also for retailer-product category pairs, with categories being of different levels as defined by a product hierarchy. The product purchase and purchase date outputs generated in the first stage can be provided to a quantity forecasting model that predicts purchases quantities for each product.

FIG. 1 is a block diagram illustrating an example system 100 for proactively predicting demand based on sparse transaction data. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system, server, or component may be provided by multiple systems, servers, or components, respectively.

A user can use a prediction application 108 to send a request for transaction predictions to a server 102. Although described as a client/server arrangement, in some implementations, functionality of the server 102 is incorporated into the prediction application 108 (or other application(s)) on the client device 104. The request for transaction predictions can include parameters for thresholds and filtering (as described in more detail below), training/testing split dates, transaction period granularity (e.g., weeks or otherwise), and requested dates/periods for which predictions are desired.

A proposed order generator 110 can generate, based on transaction data 112, a proposed order prediction 114 that includes predictions for which items may have transactions for which entities at specific points in time. For instance, the proposed order prediction 114 can include predictions of which products, at which product levels, may be purchased by which retailers in upcoming week(s). In further detail, the proposed order prediction 114 for a retailer can include a list of items that the proposed order generator 110 predicts may be bought by the retailer, along with a predicted number of units and a suggested time to make a sales visit, based on when the retailer is predicted to be most likely to buy the predicted items.

The transaction data 112 can include historical transaction data that indicates, for example, which retailer bought which product on which date with which promotions applied, and how many units were for which purchase amounts. The transaction data 112 can include sparse data for some items, meaning the transaction data 112 may include less than a threshold number of transactions for a certain retailer for a certain product in a time period. For example, a given retailer may have bought a specific product only four times in the last two years, which may be less than a predetermined threshold number of transactions. Retail sales data may be sparse for some data sets, for example. For instance, a business may sell hundreds of thousands of products to thousands of retailers, and a given retailer may be unlikely to buy all of the offered products on a regular basis.

The proposed order generator 110 can use machine learning to forecast which retailer may buy which product(s) at which time(s). The proposed order generator 110 can also account for business rules 116 when generating the proposed order prediction 114. The business rules 116 can include conditions such as a minimum number of visits to a retailer in a given time period (e.g., visit each retailer at least once per month), a minimum order value before visiting a retailer, or other rules. When generating the proposed order prediction 114, the proposed order generator 110 can use a transaction date predictor 118 and a transaction quantity predictor 120.

The transaction date predictor 118 can take as an input the transaction data 112 and output a predicted list of transaction dates for each retailer for each product level in a product hierarchy 122. Products that a business may sell to retailers can be organized using the product hierarchy 122. The product hierarchy 122 can include a generic collection of product categories at a highest level and an actual individual product at a lowest level. Products at the lowest level can be identified using a SKU (Stock Keeping Unit), for example. A next-highest level of the product hierarchy 122 can be used to group similar products/SKUs. Further higher-level categories can be used to organize products at still more general levels.

The transaction date predictor 118 can use a transaction date sequencer 124 and a transaction date modeler 126. The transaction date sequencer 124 can convert the transaction data 112 into time serie(s) that are consumable by the transaction date modeler 126. The time series can be compressed and/or uncompressed.

The transaction date modeler 126 can take as input compressed or uncompressed sequences generated by the transaction date sequencer 124, and train multiple machine learning models 128 for each of the sequences. The transaction date modeler 126 can select a best machine learning model 128 for each retailer/product hierarchy level based on heuristics. The selected machine learning model 128 can be used to generate a list of predicted transaction dates.

The transaction quantity predictor 120 can use transaction dates predicted by the transaction date predictor 118 and the transaction data 112 to predict transaction quantities (e.g., number of units) of items likely to be bought by retailers mapped to the predicted transaction dates. The transaction quantity predictor 120 can include a model trainer 130 that trains model(s) 132. A feature builder 134 can build various features for the model(s), as described in more detail below. The transaction quantity predictor 120 can use the model(s) 132, to predict quantities, for transaction dates that have been predicted by the transaction date predictor 118. Predicted quantities and transaction dates can be included in the proposed order 114.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150 and 152 are used by the client device 104 and the server 102, respectively, for communicating with other systems in a distributed environment—including within the system 100—connected to the network 106. Generally, the interfaces 150 and 152 each comprise logic encoded in software and/or hardware in a suitable combination and operable to communicate with the network 106. More specifically, the interfaces 150 and 152 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the prediction application 108. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the prediction application 108. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
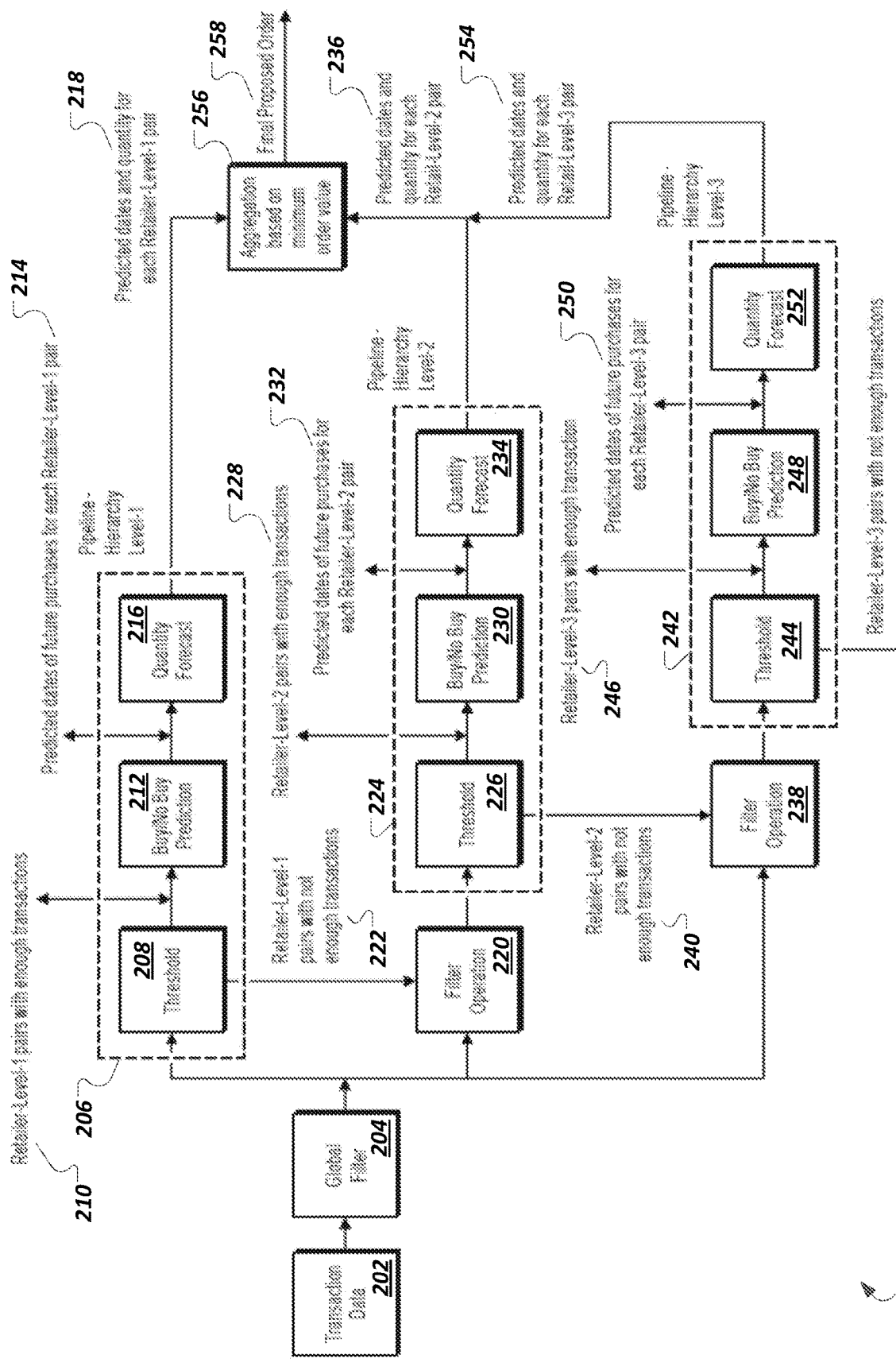
FIG. 2 is a block diagram of an example system for predicting transaction dates and quantities.

FIG. 2 is a block diagram of an example system 200 for predicting transaction dates and quantities. Transaction data 202 can be provided to (or accessed by) the system 200. Transaction date predictions can be generated for each retailer for which transaction data 202 exists, for each of multiple levels of a product hierarchy.

In the product hierarchy, a lowest product level can be an actual product. Higher product levels can be broader categories of products. Other types of product hierarchies can be used. An example product hierarchy with a product as a lowest level can have a variant group as a second lowest level, a sub brand as a third lowest level, a brand at a fourth lowest level, and a category level as a highest level in the hierarchy. Processing can be performed for all levels of the product hierarchy or a certain number of levels. For instance, processing can be performed for a set of three lowest levels in the product hierarchy (and not for other, higher levels).

Transaction data can be analyzed in terms of retailer/level-X pairs. Transaction data associated with a particular retailer/level-X pair can be transaction data related to the particular retailer buying products at level-X in the product hierarchy. For example, the business may have transaction data relating to a retailer A buying products having a particular SKU. As another example, the business may have transaction data relating to a retailer B buying products that are each included in a more general level-2 category.

In some implementations, a global filter 204 can be used so that predictions are not made for inactive products. Inactive products can be, for example, products that have no transactions, for any retailer, during a predefined previous time period (e.g., six months, one year). Other types of global filters can be used to filter transaction data before other processing is performed.

Filtering can ensure that a machine learning pipeline is evaluated on products and retailers that are actively purchasing, for example. Although machine learning models can be configured to handle sparseness of data, in some implementations, certain retailers (or certain transactions for certain retailers) can be excluded from processing if less than a minimum threshold of transactions exist for the retailer in a predetermined time frame. For example, retailer/level-X pairs can be excluded (e.g., filtered from processing) for retailers who had not had at least a certain number of transactions (e.g., five) of products of level-X in a last certain number of years (e.g., three years). The minimum threshold can be a parameter that is set each time estimates are generated. Different minimum thresholds can be used for different data sets or for different estimation generations of a same data set.

A level-one processing block 206 can be performed for retailer/level-1 pairs. A threshold process 208 can be performed to identify retailer/level-1 pairs 210 that have at least a threshold number of transactions. Generally, a retailer purchase threshold k can be established for each retailer/level-X pair (e.g., with k being the same for all retailer/level-X pairs, or different for different retailer/level-X pairs). The retailer purchase threshold can be used to identify retailer/level-X pairs that have at least the threshold k number of transactions. Identified retailer/level-X pairs can correspond to a retailer making at least k transactions of level-X, for example.

A buy/no buy modeler 212 can generate buy/no buy prediction data 214 that includes predicted dates of future transactions for each retailer/level-1 pair in the identified retailer/level-1 pairs 210, based on transaction data for the identified retailer/level-1 pairs 210. The buy/no buy prediction data 214 can be provided to a quantity forecast modeler 216 that generates quantity predictions 218 for the predicted dates.

After the level-one processing block 206 has completed (or at least partially in parallel with the level-one processing block 206), a filter operation 220 can be performed to determine transaction data for retailer/level 1 pairs 222 that do not have at least the threshold number of transactions. In some implementations, the retailer/level 1 pairs that do not have at least the threshold number of transactions are determined by the threshold process 208. Filtered transaction data determined by the filter operation 220 can be provided to a level-two processing block 224.

The level-two processing block 224, which can be similar to the level-one processing block 206, can be performed for retailer/level-2 pairs. A threshold process 226 can be performed to identify retailer/level-2 pairs 228 that have at least a threshold number of transactions. A buy/no buy modeler 230 (which can be the same as the buy/no buy modeler 212) can generate buy/no buy prediction data 232 that includes predicted dates of future transactions for each retailer/level-2 pair in the identified retailer/level-2 pairs 228, based on transaction data for the identified retailer/level-2 pairs 228. The buy/no buy prediction data 232 can be provided to a quantity forecast modeler 234 (which can be the same as the quantity forecast modeler 216) that generates quantity predictions 236 for the predicted dates.

In some implementations, other processing blocks can be performed for a variety of other levels. For example, after the level-two processing block 224 has completed (or at least partially in parallel with the level-one processing block 206 and/or the level-two processing block 224), a filter operation 238 can be performed to determine transaction data for retailer/level 2 pairs 240 that do not have at least the threshold number of transactions. In some implementations, the retailer/level 2 pairs that do not have at least the threshold number of transactions are determined by the threshold process 226. Filtered transaction data determined by the filter operation 238 can be provided to a level-three processing block 242.

The level-three processing block 242, which can be similar to the level-one processing block 206 and the level-two processing block 224, can be performed for retailer/level-3 pairs. A threshold process 244 can be performed to identify retailer/level-3 pairs 246 that have at least a threshold number of transactions. A buy/no buy modeler 248 (which can be the same as the buy/no buy modeler 212 and/or the buy/no buy modeler 230) can generate buy/no buy prediction data 250 that includes predicted dates of future transactions for each retailer/level-3 pair in the identified retailer/level-3 pairs 246, based on transaction data for the identified retailer/level-3 pairs 246. The buy/no buy prediction data 250 can be provided to a quantity forecast modeler 252 (which can be the same as the quantity forecast modeler 216 and/or the quantity forecast modeler 234) that generates quantity predictions 254 for the predicted dates.

An aggregator 256 can aggregate quantity predictions for predicted dates generated from the various processing blocks (e.g., quantity predictions 218, 236, and 254), to generate a proposed order 258, for reach retailer for which data has been aggregated. The proposed order 258 predicts which retailers are likely to buy which products in which weeks, and in what quantities.

Aggregation can account for different predictions for a product at different levels. For instance, the level-1 processing block 206 may generate a first, level-1 prediction for a product A. Product A may belong to a level-2 category of variant B. The level-2 processing block 224 can generate a second, level-2 prediction, for the variant B, which may include estimates that are relevant to product A. The aggregator 256 can account for different predictions for a same product, remove duplicate information, or perform other aggregation tasks.

As a more particular example, a product hierarchy can include a level three category of toothbrushes, a level two category of manual toothbrushes, and a level one category of actual toothbrush products. The level one category can include products P1 and P2 that are each different kinds of manual toothbrushes. Transaction data can include a threshold number of transactions that indicate purchases of the P1 toothbrush which can result in predictions for the P1 toothbrush in the level one processing block 206. The transaction data might not include the threshold number of transactions for the P2 toothbrush. However, the transaction data might include enough transactions that indicate purchases of manual toothbrushes in general, which can result in predictions for manual toothbrushes being generated in the level two processing block 224. The aggregator 256 can determine appropriate aggregate results for both the P1 toothbrush and the P2 toothbrush, based on the different estimates for different category levels.

In some implementations, business rules can be used to process or filter aggregated values before aggregated values are included in the proposed order 258. For example, a product can be included in the proposed order 258 if aggregated values for the product for the retailer are over a certain value (e.g., $1000). If aggregated values for the product for the retailer are less than the certain value, the product can be excluded from the proposed order 258 for the retailer. The proposed order 258 can be used to create a schedule for retailer visits, for example, and business rule(s) can be employed to filter out products when retailers are unlikely to buy less than a predetermined threshold amount of the product. Application of the business rule(s) can remove, from a schedule, visits that may not be worth expenditure of time and other resources.

Figure 3:
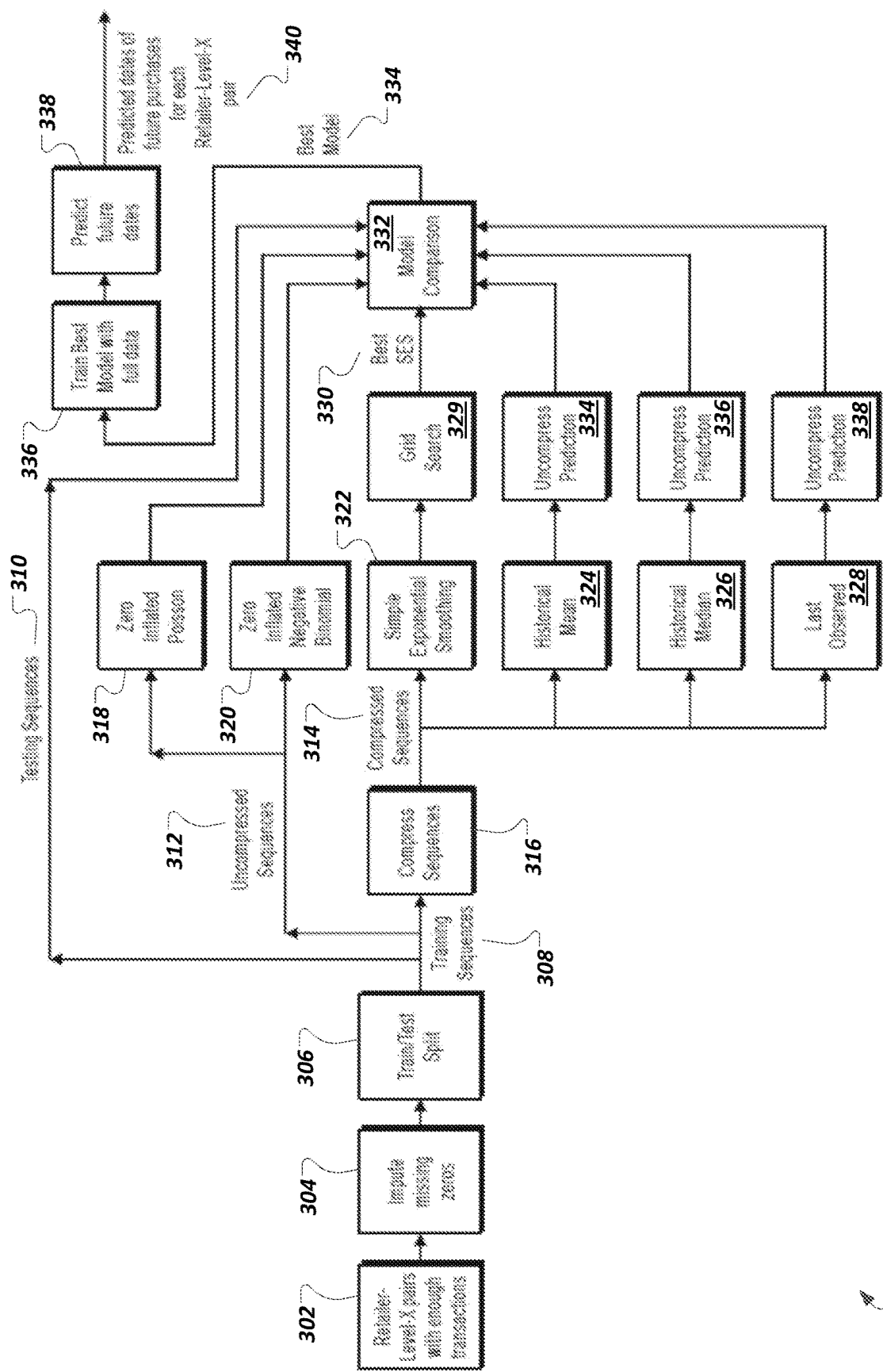
FIGS. 3 and 4 are block diagrams of example systems for generating predicted transaction dates.

FIG. 3 is a block diagram of an example system 300 for generating predicted transaction dates. The system 300 can generate predicted dates for retailer/level-X pairs for various levels (e.g., various values for "X"). For example, the system 300 can generate predicted transaction dates for retailer/level one pairs, retailer/level two pairs, etc. The system 300 can be described generically as processing transaction data 302 for retailer/level-X pairs that have at least a threshold number of transactions (e.g., as described above with respect to FIG. 2 for threshold processing). An actual run time run of the system 300 can use transaction data 302 for a specific level (e.g., level one, level two, etc.).

An imputing process 304 can impute missing zeros. For instance, the transaction data 302 may be missing values for certain retailers for certain time periods (e.g., if a retailer did not have any transactions for the product level-X in that time period). Zeros can be added to the transaction data 302 for those missing values.

A train/test splitter 306 can divide the transaction data 302 into training sequences 308 and testing sequences 310. Machine learning algorithms and models described below can be trained on the training sequences 308 and evaluated on the testing sequences 310. A train/test split can be controlled via parameter(s) or can be configured based on a predetermined split. For example, one month of data can be used for testing or a user can specify that two months are to be used for testing.

As another example, a user can specify, via parameter(s), a train end date and test end date, and the training sequences 308 can be obtained by identifying items in the transaction data 302 that have a transaction date before the train end date. Similarly, the testing sequences 310 can be obtained by identifying items in the transaction data 302 that have a transaction date between the train end date and the test end date. As a particular example, the transaction data can include transactions from 1/1/2018 to 6/30/20 and the user can specify a train end to be 5/31/20 and a test end date to be 6/30/20. Machine learning models can be trained on transaction data from 1/1/18 to 5/31/20 and evaluated based on transaction data from 6/1/20 to 6/30/20. Trained models can be used for prediction for future dates after 6/30/20.

Training sequences 308 can include uncompressed sequences 312 and compressed sequences 314. Each retailer-level-x pair can have an associated uncompressed sequence 312 and compressed sequence 314. Compressed sequences can be compressed by a sequence compressor 316. The uncompressed sequences 312 can include raw purchase history data for a retailer-level-x pair where a non-zero value indicates a purchase of level-x by the retailer in a time period, and a zero element indicates no purchase by the retailer in the time period. A time period granularity can be user specified. For instance, a time period granularity can be weekly.

The compressed sequences 314 can be generated by converting the transaction data 302 into a time series for each retailer-level-x pair. The transaction data 302 may be in a tabular format, and may include columns such as "Date", "Level-X", "Retailer", "Quantity Bought", or "Value of Quantity Bought in Local Currency". A sequencer can convert the tabular format into time series, for example of a form such as [0,0,0,10,0,0,3], where each value in the series is a purchased quantity, and the spacing between values is a user specified time interval (days, weeks, etc.).

Example transaction data for an example date range of 1/1/20 to 1/7/20 is shown below in Table 1.

TABLE 1

| Date | Retailer | Level-X | Quantity Bought | Value |
|---|---|---|---|---|
| Jan. 3, 2020 | Retailer-A | Level-1 | 10 | 100 |
| Jan. 5, 2020 | Retailer-A | Level-1 | 5 | 50 |
| Jan. 6, 2020 | Retailer-A | Level-1 | 20 | 200 |

The sequencer can output an example time series of [0,0,10,0,5,20,0] for a Retailer-A/Level-1 pair based on the data in Table 1. Non-zero elements (e.g. 10, 5, and 20) correspond to quantity values in the table. Zero values can be inferred from missing dates in the transaction data (or can correspond to previously-imputed zero values). For instance, the zero values in the example time series correspond to dates, without purchase history, of 1/1/20, 1/2/20, 1/4/20, and 1/7/20.

The compressed sequences 314 can be generated and used (instead of uncompressed data) for performance reasons and/or as inputs to models that are designed to accept compressed (vs. uncompressed) sequences. The compressed sequences 314 can include sequences where zero element(s) followed by a non-zero element in the uncompressed sequences 312 are compressed into a single value. The single value represents a time resolution until a next buy (e.g., 3 days until a next buy, 2 weeks until a next buy). The compressed zeros in the compressed sequences 314 can indicate periods of non-purchases between purchase periods.

For instance, the example time series [0,0,10,0,5,20,0] can be compressed into an example compressed sequence of [2,1,0,1]. The first 3 values of 2, 1, and 0 in the example compressed sequence represent a retailer waiting 2 days before buying 10 units, 1 day before buying 5 units, and 0 days before buying 20 units, respectively. The last '1' value can correspond to insertion of an "implied buy" at the end of the time series. An implied buy can be added to prevent losing an indefinite number of trailing zeros (e.g., non-buy dates) in the uncompressed sequence.

Uncompressed sequences 312 and compressed sequences 314 can be generated for both training and testing datasets. The uncompressed sequences 312 (for both training and testing data sets) can be used by uncompressed sequence models, such as a zero inflated Poisson model 318 and a zero inflated negative binomial model 320. The compressed sequences 314 (for both training and testing data sets) can be used by compressed sequence models, such as a Simple Exponential Smoothing (SES) model 322, a historical mean model 324, a historical median model 326, and a last observed model 328.

The zero inflated Poisson model 318 and the zero inflated negative binomial model 320 can be models that are configured to handle frequent zero-based observations. Use of the SES model 322 can include smoothing time-series data, including accounting for seasonality. The historical mean model 324 and the historical median model 326 can forecast future values based on mean or median values, respectively, in historical data. The last observed model is a naive model that can be used to set a forecasted value to be a value of a last observation. The SES model 322 can be tuned, by identifying a set of hyperparameters using a grid search process 329, to create a best SES model 330.

Each of the uncompressed sequence models and the compressed sequence models can be trained on corresponding uncompressed or compressed training data sets, respectively. After training, each of the uncompressed sequence models and the compressed sequence models can be tested on corresponding uncompressed or compressed testing data sets, respectively.

A model comparison tool 332 can compare test outputs from the compressed sequence models and outputs associated with the uncompressed sequence models. For example, the model comparison tool can compare outputs generated by or associated with the historical mean model 324, the historical median model 326, the last observed model 328, the best SES model 330, the zero inflated Poisson model 318 and the zero inflated negative binomial model 320.

The outputs from at least some of the algorithms trained on compressed sequences may generally also be compressed. To be able to compare compressed outputs to the outputs from the algorithms trained on uncompressed sequences, a decompression algorithm can be used to decompress compressed output, e.g., to generate uncompressed predictions 334, 336, and 338. Uncompressing compressed outputs can include determining if a last purchase indicator in the decompressed sequence is an actual buy or an implied buy, based on an evaluation of the original uncompressed sequence.

The model comparison tool 332 can determine a best model 340 based on the comparison of the outputs from the various models. In some implementations, models can be compared by comparing F1 scores generated for each model. A F1 score for a model can reflect the model's prediction accuracy, and can be based on true positives, false positives, and false negatives. For instance, a true positive can be generated by a model if a purchase occurred on a specific date and the model predicts that date. A false positive can be generated by a model if a purchase did not occur on a specific date but the model predicts that there was a purchase on that date. A false negative can be generated by a model is a purchase occurred on a specific date but the model did not predict that there was a purchase on that date. F1 scores for various models can be computed, and the best model 340 can be selected by determining which model has a best F1 score.

A training engine can train the best model 340 with a full set of data (e.g., an aggregate of training and testing data) to generate a trained best model 342. The trained best model 342 can include a prediction engine 344 that generates predicted dates 346 of future transactions for each retailer/level-X pair for the current value of "X".

The processing described above for the system 300 can be repeated for each retailer/level-X pair. Different models can be selected as best performing for different retailer/level-X pairs.

Figure 4:
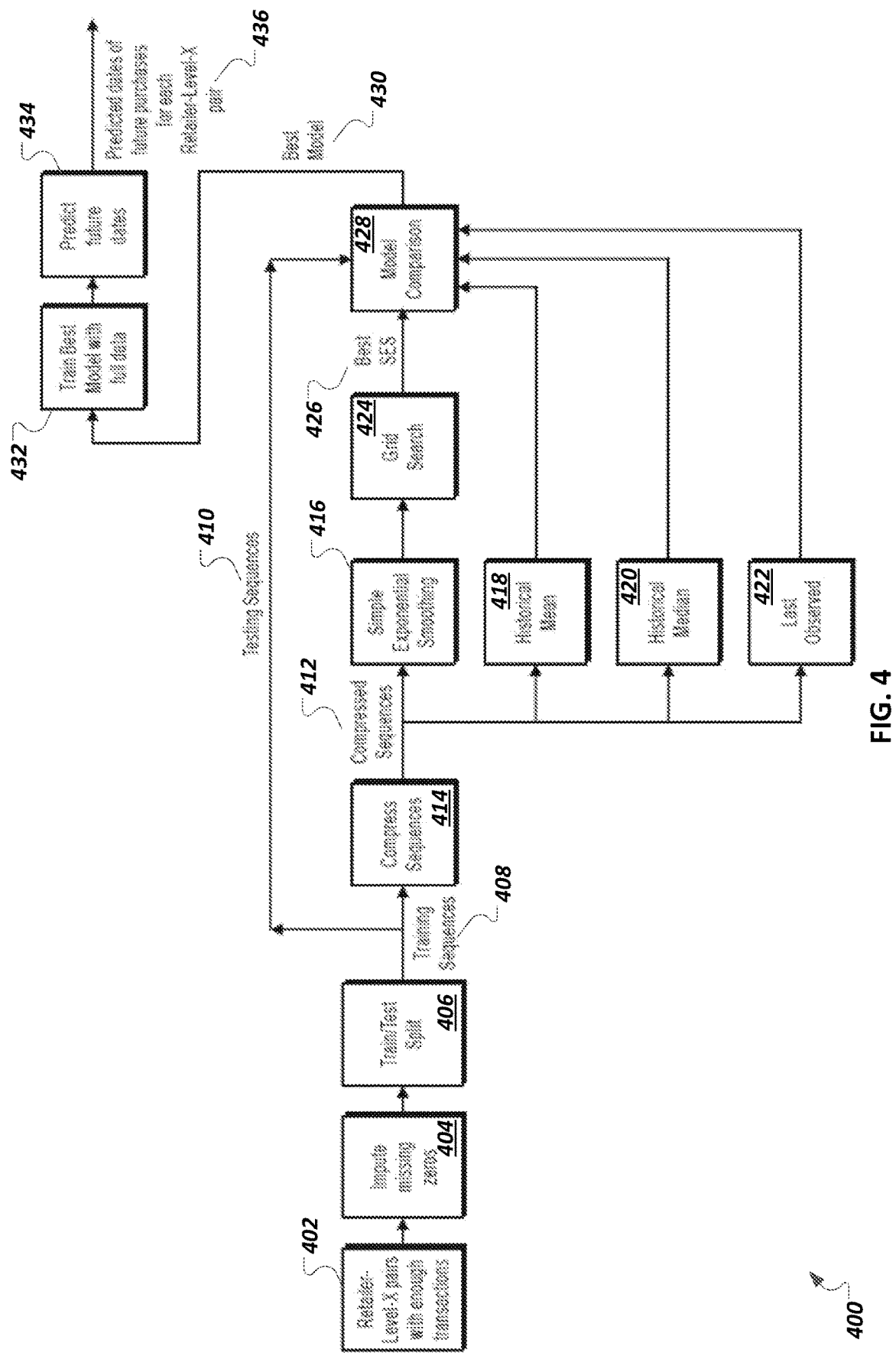

FIG. 4 is a block diagram of an example system 400 for generating predicted transaction dates. The system 400 is similar to the system 300 except the system 400 does not use uncompressed sequences. The system 400 can be used, rather than the system 300, to save computation costs, for example. Uncompressed sequences may be larger than compressed sequences, and make consume more resources when being processed, for example. The system 400 has less models so less model results are calculated (and compared), as compared to the system 300.

The system 400 can generate predicted dates for retailer/level-X pairs for various levels (e.g., various values for "X"). For example, the system 400 can process transaction data 402 for retailer/level-X pairs that have at least a threshold number of transactions (e.g., as described above with respect to FIG. 2 for threshold processing). An imputing process 404 can impute missing zeros in the transaction data 402. A train/test splitter 406 can divide the transaction data 402 into training sequences 408 and testing sequences 410. As compared to the system 300, the system 400 can use compressed sequences 412 but not uncompressed sequences. Compressed sequences can be compressed by a sequence compressor 414.

The compressed sequences 412 can be used by compressed sequence models, such as a SES model 416, a historical mean model 418, a historical median model 420, and a last observed model 422. The SES model 416 can be tuned, by identifying a set of hyperparameters using a grid search process 424, to create a best SES model 426. The compressed sequence models can generate test sequences A model comparison tool 428 can compare outputs from the compressed sequence models to determine a best model 430. With the system 400, predicted and actual test sequences are compressed sequences. A heuristic that can be used by the model comparison tool 428 to compare models is a Mean Absolute Scaled Error (MASE) heuristic. The MASE heuristic represents an error from the model under consideration divided by an error from a naive model. The naive model predicts the last observed value in the training sequence. The MASE heuristic can be calculated using a formula of:

MASE=absolute_value(True Value−Predicted Value)/
absolute_value(True Value−Naive Predicted
Value).

A training engine can train the best model 430 with a full set of data to generate a trained best model 432. The trained best model 432 can include a prediction engine 434 that generates predicted dates 436 of future transactions for each retailer/level-X pair for the current value of "X".

Figure 5:
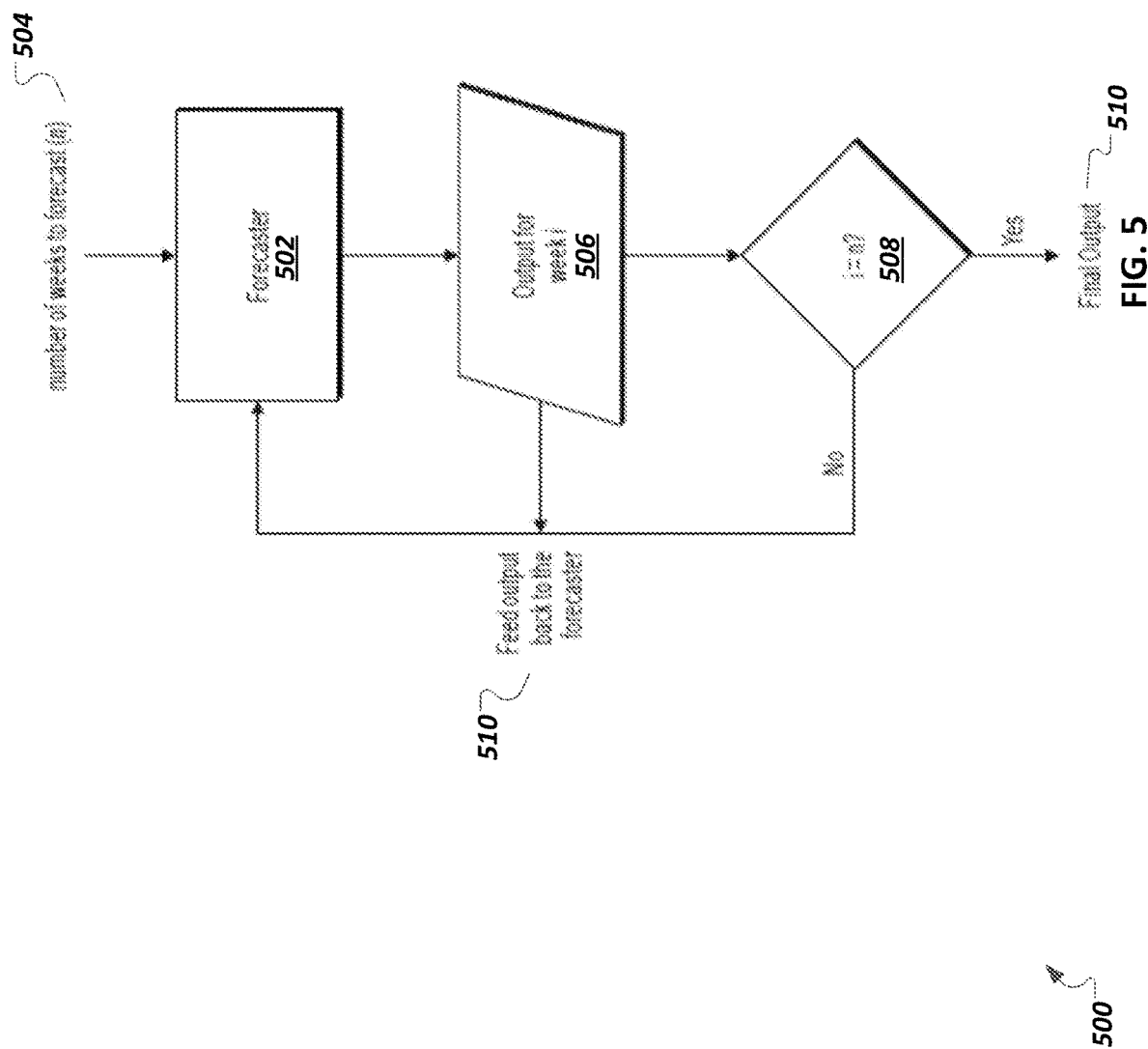
FIG. 5 illustrates an example system for multiple-week prediction.

FIG. 5 illustrates an example system 500 for multiple-week prediction. Although weeks are described, other time units/periods can be used (e.g., days, months, years). A forecaster 502 can receive an input 504 indicating a number of n weeks to forecast. The number n can be one or greater than one, for example. In some implementations, the input 504 is a date range and the forecaster 502 determines a count of weeks (and which weeks) for which to generate forecast(s). The forecaster 502 can be trained on historical data that precedes the weeks for which forecasts are to be generated.

The forecaster 502 can generate a prediction 506 (e.g., transaction date and quantity prediction) for the first week (e.g., a week 1 of n). The forecaster 502 can make a determination 508 as to whether there are more weeks for which to generate forecasts. If there are more weeks for which to generate forecasts, the forecaster 502 can use the prediction 506 as a feedback input 510 for updating a prediction model. Updating the prediction model can include building features based on the prediction 506 (and earlier data). The forecaster 502 can then use the updated prediction model to generate a prediction for a next week. If, during the determination 508, the forecaster 502 determines that there are no more weeks for which to generate predictions, a final output 510 can be generated (e.g., that includes respective predictions previously generated for individual weeks).

Figure 6:
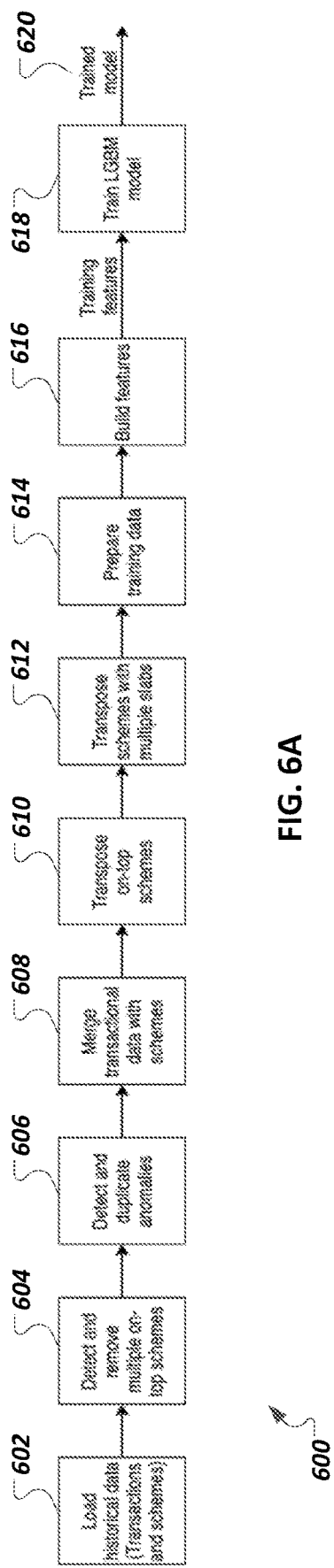
FIG. 6A is a flowchart of an example method for training a quantity forecasting model.
FIG. 6B illustrates example features for a quantity forecasting model.

FIG. 6A is a flowchart of an example method 600 for training a quantity forecasting model. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the system 100 described above with respect to FIG. 1. For example, the method 600 and related methods can be executed by the server 102 of FIG. 1.

The quantity forecasting model can be trained to predict how many units (e.g., quantity) of a product are likely to be bought by a retailer in each week (or other time period) for which forecasts are desired. The quantity forecasting model can use as input(s) transaction dates for retailer/level-X pairs obtained from a buy/no buy model.

At 602, historical data, including transactions and schemes, is loaded into the quantity forecasting model. Schemes can be promotions offered on different products to promote the sale of those items.

Promotions can be of different types. For example, a promotion can offer a percentage discount (e.g., receive x % off a regular price) or an absolute discount (e.g., receive $x off a regular price). As another example, a promotion can offer free goods (e.g., get x units of item A for free when purchasing item B).

Promotions can be offered on different types of purchases. For instance, a promotion can be offered on a value purchase or a volume purchase. A value purchase example can be that a discount is awarded for buying $x worth of item A. A volume purchase example can be that a discount is awarded for buying x units of item A.

In some implementations, promotions are applied in "slabs". Slabs can be used to set thresholds for different amount of discounts when different volume of products are bought. For instance, for a "volume" type scheme, a first slab can correspond to receiving x % off of a regular price when buying 10 to 20 units of a product and a second slab can correspond to receiving a (x+5)% discount when buying more than 20 units of the product. As another example, for a "value" type scheme, a first slab can correspond to receiving x % off a regular price when buying goods worth $1000 to $2000 and a second slab can correspond to receiving a (x+5)% discount when buying more than $2000 worth of product(s).

At 604, multiple on-top schemes are detected and removed. An on-top scheme is an additional (e.g., beyond a first) scheme that may be applied to a retailer/product pair along with the first scheme. For example, the first scheme may be a 10% base discount, and a 6% additional, on-top discount may be applicable for specific customer(s). On-top schemes may be removed for some or all models, such as for models that are configured for one base scheme.

At 606, anomalies are detected and duplicated. An anomalous transaction can be a transaction which is an outlier with respect to a retailer's past purchase history. For example, a transaction can be identified as an anomalous transaction when a purchase value exceeds 200% of a maximum value that the retailer has ever spent on that item. In some implementations, identified anomalous transactions can be replicated (e.g., duplicated) to give the anomalous transaction more weight. A single anomalous transaction may be simply ignored by some models, for example (e.g., as an extreme outlier). Duplicated anomalous transactions may be prevented from being discarded (resulting in consideration by the model). Duplication can add a small amount of weight to the duplicated anomalous transactions, but a weight of regular (e.g., non-anomalous) transactions can still generally far outweigh the anomalous transactions, due to a much higher number of regular transactions.

At 608, transactional data is merged with schemes. Schemes can be merged with transactional data so that scheme information is considered while training the forecasting model. Scheme information can be represented by scheme attributes, such as a scheme type (e.g., volume or value), a unit of discount (e.g., percentage, absolute value, free goods), a purchase "from" value or volume (e.g., a minimum value that a retailer needs to spend or minimum number of units that a retailer needs to buy to be eligible for a discount), a purchase "to" value or volume (e.g., applicable when a scheme has multiple slabs), and a discount value (e.g., an actual discount offered, either as a percentage or currency amount, or a number of units of free items). If a scheme has multiple slabs, then the unit of discount, purchase-from value or volume, and purchase-to value or volume attributes can have multiple values corresponding to the different slabs. When merging the transactional data with scheme information, each historic transaction that corresponds to a production on promotion can be mapped to the various relevant scheme attributes described above, that apply to the promotion.

At 610, on-top schemes are transposed.

At 612, schemes are transposed with multiple slabs. Multiple slabs correspond to quantity ranges that entail a different discount. When there are multiple schemes (e.g., on top schemes) or multiple slabs, the multiple schemes and multiple slabs can be transposed so that scheme information has a 1:1 relationship with a promotional scheme.

At 614, training data is prepared. The transactional data can be split into different portions, such as a training set, a validation set, and a testing set. For instance, all available transaction data except a last four months can be used as a training set. Three months of historical transaction data, e.g., from three months ago, two months ago, and one month ago, can be used as a validation set. A last month of historical transaction data can be used as a testing set.

At 616, features are built into the quantity forecasting model. Various features can be computed from the transactional data that may have an impact on a quantity of product of a given product hierarchy level that a retailer might purchase. Features can be time-series based or other types of features. Some example features are described below with respect to FIG. 6B.

At 618, training features are used to train a LGBM (Light Gradient Boosting Model), to produce a trained model 620. The trained model can be used for predictions, as described below. The LGB model can correspond to a tree-based regression algorithm.

Training can include using the training data set and the validation set for selection of hyperparameters for the model. For instance, LGB regression can use a set of hyperparameters that can be tuned, so that the model provides more accurate results. Tuning of hyperparameters can be performed once (or more than once) using the training and validation datasets. A most optimal combination of values of the hyperparameters can be selected and used for subsequent predictions made using the model. Hyperparameters can include: number of estimators in the tree, total number of leaves, a learning rate, minimum data per leaf node, fraction of features to be used for training, fraction of data to be used for training, and other optimization metrics. Hyperparameters can be selected using a random search technique. Random searching techniques can include optimization methods such as direct-search, derivative-free, or black-box methods. Model performance on the validation set can be evaluated using, for example, a root mean squared log error. The root mean squared log error can also be used to measure the effectiveness of a tuned model (e.g., after hyperparameters have been selected) that has been tested using the testing data set.

FIG. 6B illustrates example features 650 for a quantity forecasting model. A cumulative sum feature 652 can be built for each of monthly 654, quarterly 656, and yearly 658 time periods. For example, a monthly cumulative sum feature can correspond to a total value spent by a retailer on a product level-X from the beginning of the current month up to the current week. A quarterly cumulative sum feature can correspond to a total value spent by a retailer on a product level-X from the beginning of the current quarter up to the current week. A yearly cumulative sum feature can correspond to a total value spent by a retailer on a product level-X from the beginning of the current year up to the current week.

A cumulative sum feature 652 can also be built, for monthly, quarterly, and yearly time periods, at a product group level 660. Different products that have similar characteristics can be grouped together in a same product group. A product group can represent product relationships that are reflected, for example, by a customer tending to buy a substitute product that is similar to an unavailable product. Product groups can capture substitute product buying patterns.

For each group-level feature, a group to item ratio feature 661 can be built. For example, a ratio of product group monthly cumulative sum to product monthly cumulative sum can be calculated and used as a separate feature.

Similar to cumulative sum features, an expanding mean feature 662 can be built for each of monthly 664, quarterly 666, and yearly 668 time periods. For example, a monthly expanding mean feature can correspond to a mean weekly value spent by a retailer on a product level-X from the beginning of the current month up to the current week, a quarterly expanding mean feature can correspond to a mean weekly value spent by a retailer on a product level-X from the beginning of the current quarter up to the current week, and a yearly expanding mean feature can correspond to a mean weekly value spent by a retailer on a product level-X from the beginning of the current year up to the current week. A cumulative sum feature 662 can also be built, for each of monthly, quarterly, and yearly time periods, at a product group level 670. For each group-level expanding mean feature, a group to item ratio feature 671 can be built.

Other features can be developed, including lags and differences features 674, a retailer identifier feature 676, a product level-x identifier feature 678, a product level-X group identifier feature 680, a quarter of transaction feature 682, a month of transaction feature 684, a week of month of transaction feature 686, an is-first-week-of-month feature 688, an is-last-week-of-month feature 690, or other features.

For the lags and differences features 674, a lags feature can reflect an amount of sales in a previous time period t-1. A differences feature can represent a difference between sales in a previous time period t-1 and a time period before the previous time period, e.g., t-2. Lags and differences can be calculated on a weekly level for each retailer. Multiple lags and/or differences features can be aggregated to calculate a total amount spent by a given retailer in a set of multiple past weeks.

The is-first-week-of-month feature 688 can be a Boolean value that represents whether a transaction date is the first week of a month. Similarly, the is-last-week-of-month feature 690 can be a Boolean value that represents whether a transaction date is the last week of a month.

Various features can be created related to schemes. For instance, scheme-related features 692 can include different features for various attributes that represent scheme information.

Figure 7:
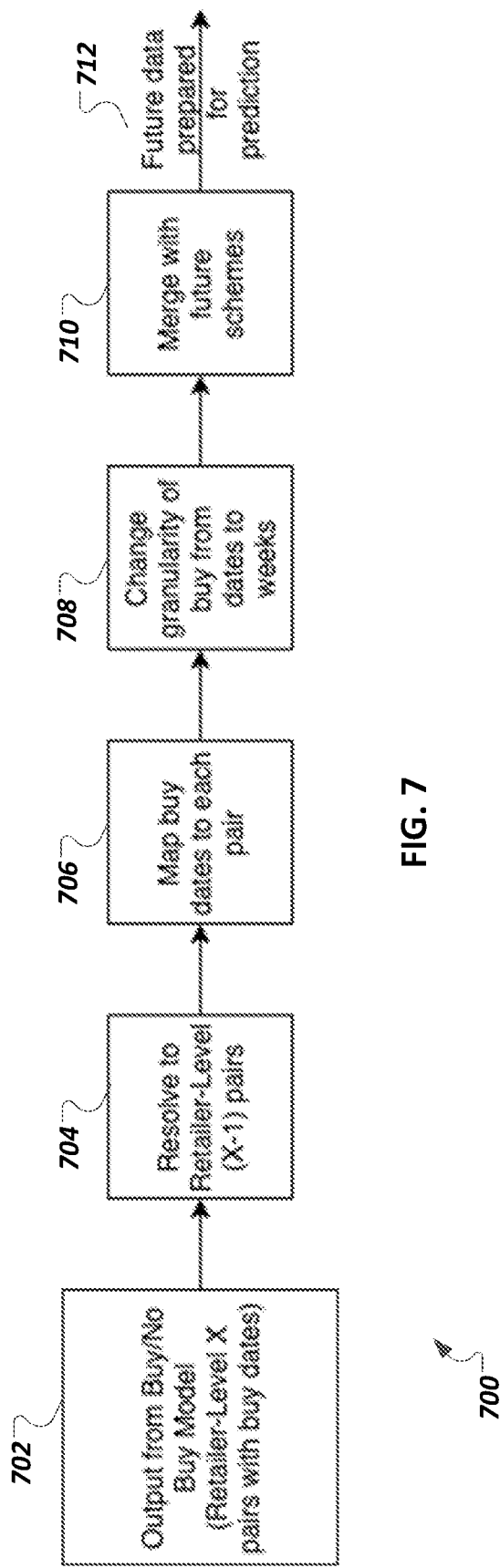
FIG. 7 is a flowchart of an example method for preparing data for quantity forecasting.

FIG. 7 is a flowchart of an example method 700 for preparing data for quantity forecasting. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by the server 102 of FIG. 1.

At 702, output from a buy/no buy model is received. The buy/no buy model output can include predicted buy dates for retailer/level-X pairs. As an example (that is continued below), a current month may be July 2020, and a forecast request can be for a future month of August 2020. The buy/no buy model may have outputted predicted transaction dates of 8/9/2020 and 8/23/2020 for a retailer R1 and a level two (e.g., variant) value of V1.

At 704, received data is resolved to retailer/level X-1 pairs. For instance, retailer/level-X pairs can be resolved to retailer/level-(X-1) pairs. For instance, if level two of the hierarchy is a product variant and level one is a product level, data for variant levels can be resolved to products. Resolving to level X-1 pairs can be performed based on a most recent set of transactions on product level-(X-1) for by a retailer under a given product level-X. A time period for determining most recent transactions can be dynamic or can be preconfigured. A most-recent time period can be three months, for example.

Continuing with the R1 retailer example, active product level one items for the R1/V1 pair can be obtained from the transaction data. For instance, all transactions in a most-recent time period (e.g., three months, such as May, June, and July of 2020) can be retrieved from the transaction data and evaluated. Evaluation can include identification of items under the V1 category that were bought by retailer R1. The items under the V1 category (e.g., different products identified as being in the broader V1 category) that were bought by R1 can be identified. For example, a P1 product and P2 product that were purchased by R1 may be underneath the V1 level.

At 706, buy dates are mapped to each pair. For instance, since two products under the V1 category were identified as active products in recent transactions, both the P1 and the P2 products can be mapped to each of the two buy dates (e.g., 8/9/20 and 8/23/20) that were predicted for the V1 category by the buy/no buy model. For instance, Table 2 below includes a retailer column (with values of R1 for this example), a level-X column (e.g., the variant V1 in this example), a level X-1 column (e.g., either P1 or P2), and a buy date column (e.g., either 8/9/2020 or 8/23/2020). Table 2 includes four rows, after each of the P1 and P2 products have been mapped to each of the 8/9/2020 and 8/23/2020 predicted dates.

TABLE 2

| Retailer | Product Level-X | Product Level-(X − 1) | Buy Date | Year | Quarter | Month | Week of Month |
|---|---|---|---|---|---|---|---|
| R1 | V1 | P1 | 2020 Aug. 9 | 2020 | 3 | 8 | 2 |
| R1 | V1 | P2 | 2020 Aug. 9 | 2020 | 3 | 8 | 2 |
| R1 | V1 | P1 | 2020 Aug. 23 | 2020 | 3 | 8 | 4 |
| R1 | V1 | P2 | 2020 Aug. 23 | 2020 | 3 | 8 | 4 |

At 708, granularity of buy dates are changed from received dates to week dates. For example, buy dates can be converted into corresponding week and month values. For instance and as shown in Table 2, date values of 8/9/2020 can be converted to month 8, week of month 2, and date values of 8/23/2020 can be converted to month 8, week of month 4.

At 710, current data is merged with future schemes, to create prepared predicted transaction date data 712, to be used in a quantity prediction phase. Prepared transaction date data 712 can be data as shown in Table 2, that is merged with the future scheme information.

Figure 8:
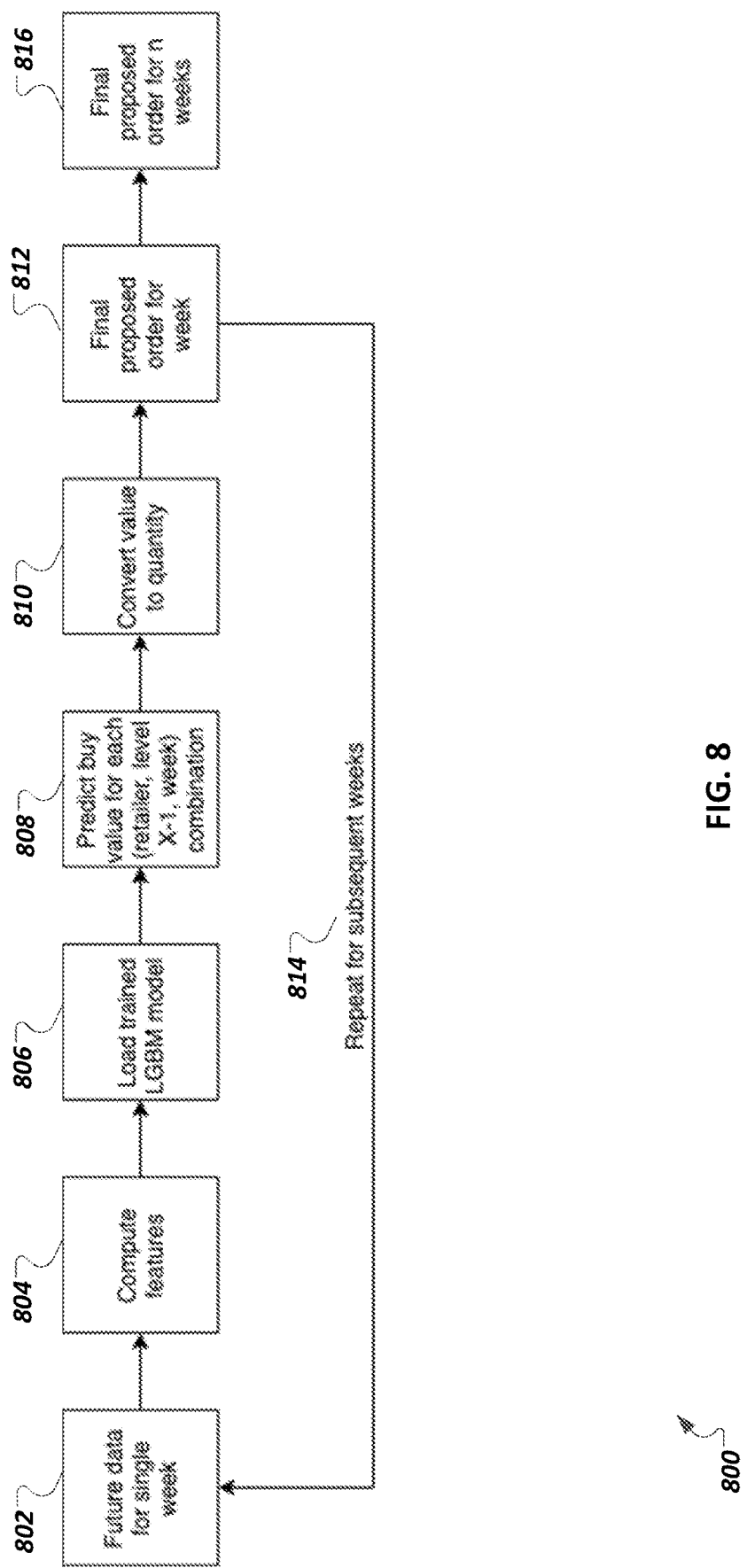
FIG. 8 is a flowchart of an example method for quantity forecasting and proposed order generation.

FIG. 8 is a flowchart of an example method 800 for quantity forecasting and proposed order generation. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 100 described above with respect to FIG. 1. For example, the method 800 and related methods can be executed by the server 102 of FIG. 1.

At 802, in response to a request to generate transaction quantity estimates for one or more weeks, prepared predicted transaction date information can be retrieved. The prepared predicted transaction date information can be information generated during execution of the method 700, for example. Prepared predicted transaction date information can be retrieved week by week, for each week for which transaction quantities are desired.

At 804, features associated with a trained quantity forecasting model are computed. The computed features can be computed for buy date predictions received from a buy/no buy model. The features that are computed can be all or some of the features described with respect to FIG. 6B, and/or other features.

At 806, the computed features are loaded into the trained quantity forecasting model. The trained quantity forecasting model can be a LGBM model, for example.

At 808, a transaction value is predicted for each retailer, level X-1, and week combination. For example, a unit price can be associated with each product level-X. The quantity forecasting model can include total value as a dependent variable which can be estimated by the model.

At 810, the predicted transaction values are converted to quantity values. For example, a number of items can be calculated by dividing a forecasted total value by a unit price value.

At 812, a final proposed order for a current week is generated. The final proposed order can include predicted transaction dates determined by a transaction date predictor and the quantity values predicted by the trained quantity forecasting model.

As illustrated by an arrow 812, steps 802 to 810 can be repeated for one or more additional weeks (e.g., when the request corresponds to multiple weeks).

At 814, when repeating for multiple weeks, data predicted for an earlier week can be included as input data when recalculating feature values and/or predicted values for a next week's prediction.

At 816, when requests for multiple weeks are received, a final proposed order for the multiple weeks can be generated, e.g., that includes multiple proposed orders generated for specific weeks. As mentioned above, generation of a final proposed order can include application of various business rules (e.g., minimum order threshold, minimum number of visits, or other rules).

Figure 9:
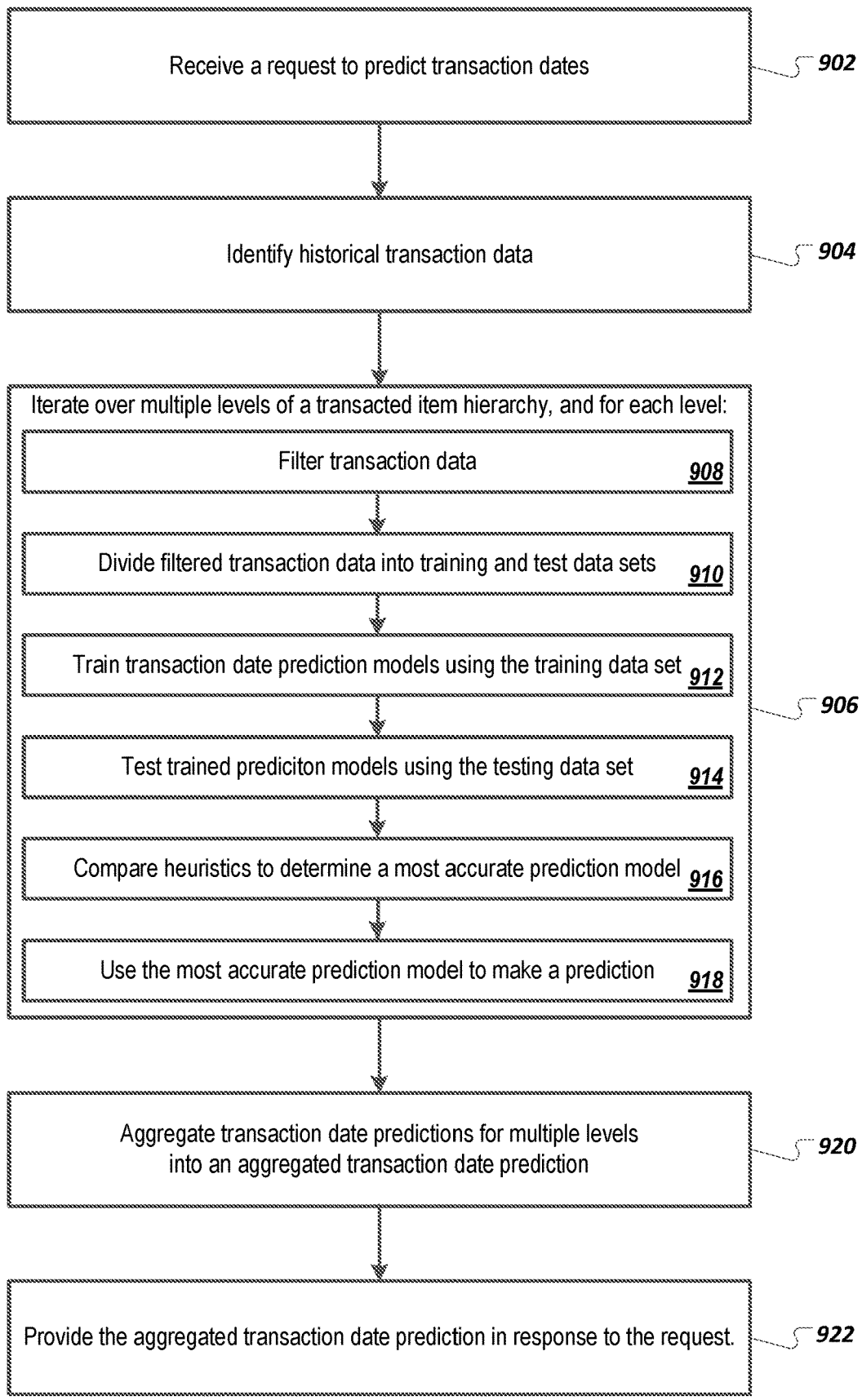
FIG. 9 is a flowchart of an example method for predicting transaction dates.

FIG. 9 is a flowchart of an example method for predicting transaction dates. It will be understood that method 900 and related methods may be performed, for example, by any suitable system, environment, software, and hardware, or a combination of systems, environments, software, and hardware, as appropriate. For example, one or more of a client, a server, or other computing device can be used to execute method 900 and related methods and obtain any data from the memory of a client, the server, or the other computing device. In some implementations, the method 900 and related methods are executed by one or more components of the system 100 described above with respect to FIG. 1. For example, the method 900 and related methods can be executed by the server 102 of FIG. 1.

At 902, a request is received to predict transaction dates for a plurality of transaction entities for a future time period. A transaction entity can be a retailer, for example.

At 904, historical transaction data is identified for the transaction entities for a plurality of categories of transacted items. The plurality of categories is organized using a hierarchy of levels. A lowest level of the hierarchy can correspond to a transacted item. Higher levels of the hierarchy can correspond to more general categories of transacted items.

At 906, multiple levels of the hierarchy are iteratively processed, starting at a lowest level. Iterating can include multiple processing steps for each processed level.

At 908, for a current level, filtered transaction data for transaction entities that have participated in at least a threshold number of transactions of transacted items in the current level is determined from the historical transaction data. Data processed in an iteration for a next highest level can include transaction data for transaction entities that did not participate in at least a threshold number of transactions of transacted items in a previous lower level in the hierarchy.

At 910, the filtered transaction data for the current level is divided into a training data set and a testing data set.

At 912, a plurality of transaction date prediction models for the current level are trained, using the training data set, to generate a plurality of trained transaction date prediction models for the current level. Prediction models can be configured to use compressed or uncompressed sequences. Prediction models that use uncompressed sequences can include a zero-inflated Poisson model, a zero-inflated negative binomial model, or other types of models. Prediction models that use compressed sequences can include historical mean, historical median, last-observed, simple exponential smoothing, or other types of models.

At 914, each trained transaction date prediction model for the current level is tested using the testing data set to generate a heuristic for each trained transaction date prediction model of the current level.

At 916, the heuristics for the plurality of trained transaction date prediction models for the current level are compared to determine a most accurate transaction date prediction model for the current level that most accurately predicts transaction dates of transactions in the current level. Different types of models can be selected for different hierarchy levels. Output from a compressed model can be decompressed before being compared to an output from an uncompressed model. When both compressed and uncompressed models are used, all compressed outputs can be decompressed before being compared to one another (or to uncompressed model outputs). The most accurate transaction date prediction model can be retrained on data that comes from both the training data set and the testing data set.

At 918, the most accurate transaction date prediction model is used to make a prediction of transaction dates for the current level for the future time period.

At 920, transaction date predictions for multiple levels are aggregated into an aggregated transaction date prediction.

At 922, the aggregated transaction date prediction is provided in response to the request.

In some implementations, a transaction date prediction for a given level is provided to a transaction quantity forecaster that generates a transaction quantity prediction for the level based on the transaction date prediction for the level. Transaction quantity predictions from different levels can be aggregated with the aggregated transaction date prediction into an aggregated transaction date and quantity prediction. The aggregated transaction date and quantity prediction can be a transaction entity visit schedule for scheduling visits to transaction entities that are predicted to have certain transactions on certain dates and in certain quantities. At least one inclusion rule can be applied to the transaction entity visit schedule. An inclusion rule can be a business rule, for example. Inclusion rules can include a minimum visit rule (e.g., making sure each transaction entity is visited at least a certain number of times in a given time period) or a minimum predicted transaction value rule (e.g., other than minimum number of visits, other visits can be scheduled if a predicted transaction value is more than a certain amount).

Figure 10:
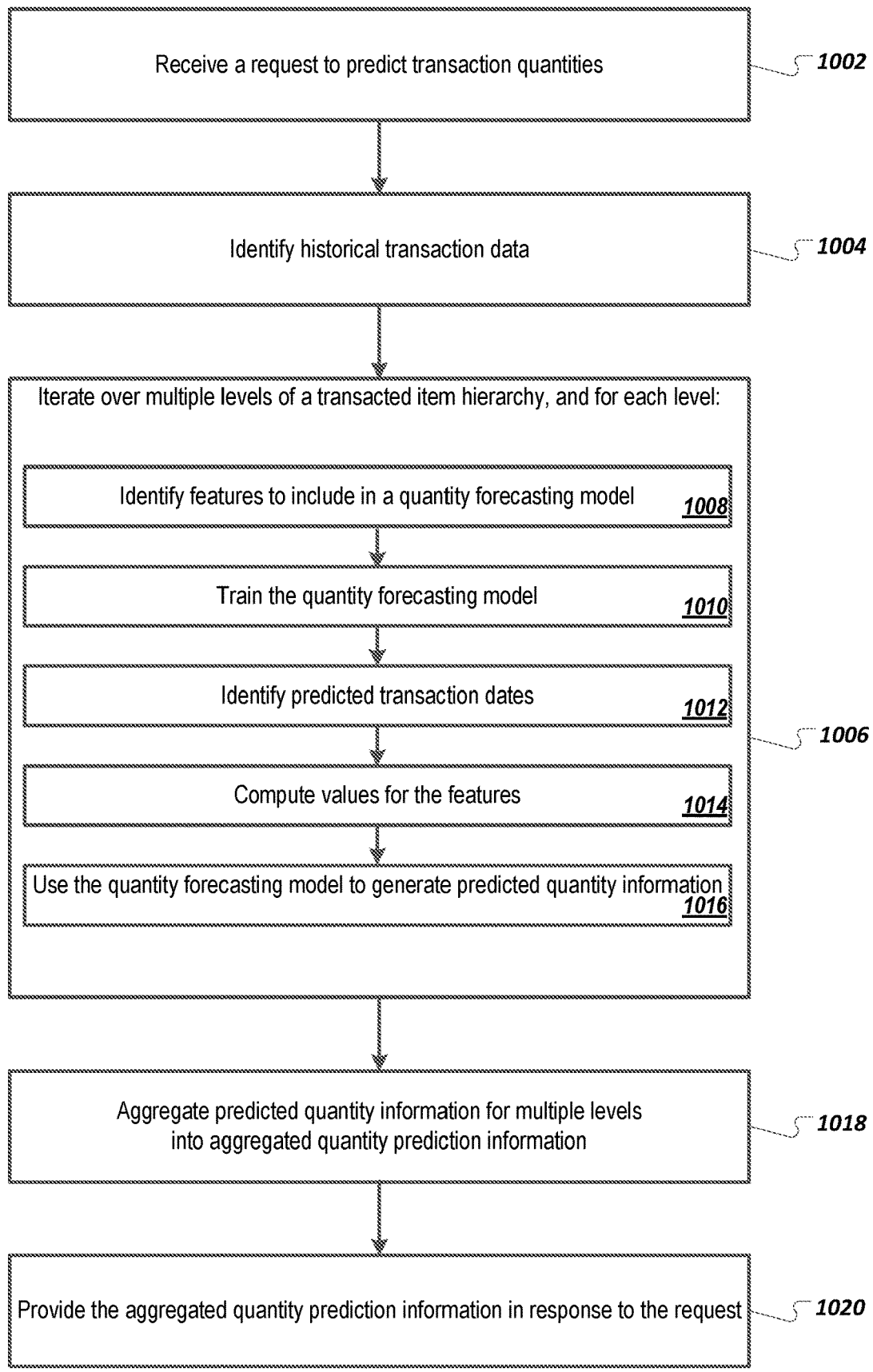
FIG. 10 is a flowchart of an example method for predicting transaction quantities.

FIG. 10 is a flowchart of an example method for predicting transaction quantities. It will be understood that method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more components of the system 100 described above with respect to FIG. 1. For example, the method 1000 and related methods can be executed by the server 102 of FIG. 1.

At 1002 a request is received to predict transaction quantities for a plurality of transaction entities for a future time period.

At 1004, historical transaction data is identified for the transaction entities for a plurality of categories of transacted items. The plurality of categories are organized using a hierarchy of levels. A lowest level of the hierarchy can correspond to a transacted item. Higher levels of the hierarchy can correspond to more general categories of transacted items.

At 1006, multiple levels of the hierarchy are iteratively processed, starting at a lowest level. Iterating can include multiple processing steps for each processed level.

At 1008, features to include in a quantity forecasting model for the current level are identified. Different features can be identified for different levels or one set of features can be identified to be used for all levels. Features can include promotion-related features, cumulative sum features, expanding mean features, or other features.

At 1010, the quantity forecasting model is trained, including building the identified features into the quantity forecasting model. Training can also include training the quantity forecasting model using promotion information that has been merged with the historical transaction data.

At 1012, predicted transaction dates predicted for the current level by a transaction date prediction model are identified.

At 1014, values are computed for the features using the predicted transaction dates and the historical transaction data.

At 1016, the quantity forecasting model is used to generate predicted quantity information for the current level for the predicted transaction dates. The predicted quantity information can be or include predicted transaction values. Predicted number of units can be determined based on the predicted transaction values.

At 1018, predicted quantity information for multiple levels is aggregated to create aggregated quantity prediction information.

At 1020, the aggregated quantity prediction information is provided in response to the request. In some implementations, the aggregated quantity prediction information is aggregated with corresponding predicted transaction dates into an aggregated transaction date and quantity prediction. The aggregated transaction date and quantity prediction can be a transaction entity visit schedule for scheduling visits to transaction entities that are predicted to have certain transactions on certain dates an in certain quantities. At least one inclusion rule can be applied to the transaction entity visit schedule. An inclusion rule can be a business rule, for example. Inclusion rules can include a minimum visit rule (e.g., making sure each transaction entity is visited at least a certain number of times in a given time period) or a minimum predicted transaction value rule (e.g., other than minimum number of visits, other visits can be scheduled if a predicted transaction value is more than a certain amount).

In some implementations, the quantity forecasting model for the current level is configured based on a particular base time period (e.g., a week). The request can correspond to a date range that includes multiple instances of the base time period (e.g., multiple weeks). Predicted quantity information can be separately generated for each instance of the time period (e.g., for each week) and predicted quantity information for instances that are earlier in the date range (e.g., earlier weeks) can be used when generating predicted quantity information for instances that are later in the date range (e.g., later weeks).

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving a request to predict transaction quantities for a plurality of transaction entities for a future time period;
identifying historical transaction data for the transaction entities for a plurality of categories of transacted items, wherein the plurality of categories are organized using a hierarchy of levels;
dividing the future time period into a set of multiple time units;
for each respective time unit of the multiple time units:
iterating over multiple levels of the hierarchy and combinations of transaction entities and transacted items starting at a lowest level, wherein the iterating includes determining, as transaction data to use for the lowest level, historical transaction data from pairs of transacted entities and transacted items for which at least a threshold number of transactions have occurred for the lowest level, and wherein the iterating includes, for each current level in the iteration and for each transacted item:
identifying features to include in a machine learning quantity forecasting model for the current level, the transacted item, and the time unit;
building the identified features into the machine learning quantity forecasting model for the current level, the transacted item, and the time unit;
using, by at least one computing device, the features to train the machine learning quantity forecasting model for the current level, the transacted item, and the time unit to generate a trained machine learning quantity forecasting model for the current level, the transacted item, and the time unit, including using a training dataset to tune hyperparameters for the machine learning quantity forecasting model;
identifying multiple machine learning transaction date prediction models, wherein the multiple machine learning transaction date prediction models include at least one compressed model configured to use compressed training data;
generating uncompressed training data;
generating, by the at least one computing device and from the uncompressed training data, compressed training data for the at least one compressed model, including compressing patterns of multiple zero elements followed by a non-zero element into a single value;
training, using the at least one computing device, each of the multiple machine learning transaction date prediction models using the compressed training data determined from transaction data for the current level;
identifying, by each respective machine learning transaction date prediction model, predicted transaction dates in the time unit predicted for the current level;
comparing each of the multiple machine learning transaction date prediction models based on prediction accuracy data generated from testing data determined from the transaction data for the current level, wherein the comparing includes decompressing, by the at least one computing device, compressed results from compressed models before the comparing;
selecting a best machine learning transaction date prediction model for the current level based on the comparison of all of the multiple machine learning transaction date prediction models, wherein a first best machine learning transaction date prediction model selected for a first level is a different type of machine learning model than a second best machine learning transaction date prediction model selected for a different second level;
training, using the at least one computing device, the best machine learning transaction date prediction model based on both the testing data for the current level and the training data for the current level;
computing values for the features using predicted transaction dates in the time unit generated by the best machine learning transaction date prediction model and the historical transaction data;
using the trained machine learning quantity forecasting model to generate predicted quantity information for the current level for the transacted item for the predicted transaction dates in the time unit;
using the predicted quantity information for the current level for the predicted transaction dates in the time unit to identify updated features to use in an updated machine learning quantity forecasting model for a next time unit of the multiple time units;
determining next pairs of transacted entities and transacted items to use for a next level by determining pairs of transacted entities and transacted items for which at least the threshold number of transactions have not occurred for the current level; and
determining, as transaction data to use for the next level, historical transaction data for the next pairs of transacted entities and transacted items for which at least the threshold number of transactions have occurred for the next level;

aggregating, for each transacted item, predicted quantity information for multiple levels into aggregated quantity prediction information; and
providing the aggregated quantity prediction information in response to the request.

2. The method of claim 1, where a lowest level of the hierarchy corresponds to a transacted item.

3. The method of claim 2, wherein higher levels of the hierarchy correspond to more general categories of transacted items.

4. The method of claim 1, wherein the aggregated quantity prediction information is aggregated with corresponding predicted transaction dates into an aggregated transaction date and quantity prediction.

5. The method of claim 4, wherein the aggregated transaction date and quantity prediction comprises a transaction entity visit schedule for scheduling visits to transaction entities that are predicted to have certain transactions on certain dates an in certain quantities.

6. The method of claim 5, further comprising applying at least one inclusion rule to the transaction entity visit schedule.

7. The method of claim 6, wherein the at least one inclusion rule includes a minimum visit rule or a minimum predicted transaction value rule.

8. The method of claim 1, wherein the predicted quantity information comprises predicted transaction value and the method further comprises determining predicted number of units based on the predicted transaction value.

9. The method of claim 1, wherein the machine learning quantity forecasting model is trained using promotion information that has been merged with the historical transaction data.

10. The method of claim 9, wherein the features include promotion-related features.

11. The method of claim 1, wherein the features include cumulative sum or expanding mean features.

12. A system comprising:
one or more computers; and
a computer-readable medium coupled to the one or more computers having instructions stored thereon which, when executed by the one or more computers, cause the one or more computers to perform operations comprising:
receiving a request to predict transaction quantities for a plurality of transaction entities for a future time period;
identifying historical transaction data for the transaction entities for a plurality of categories of transacted items, wherein the plurality of categories are organized using a hierarchy of levels;
dividing the future time period into a set of multiple time units;
for each respective time unit of the multiple time units:
iterating over multiple levels of the hierarchy and combinations of transaction entities and transacted items starting at a lowest level, wherein the iterating includes determining, as transaction data to use for the lowest level, historical transaction data from pairs of transacted entities and transacted items for which at least a threshold number of transactions have occurred for the lowest level, and wherein the iterating includes, for each current level in the iteration and for each transacted item:
identifying features to include in a machine learning quantity forecasting model for the current level, the transacted item, and the time unit;

building the identified features into the machine learning quantity forecasting model for the current level, the transacted item, and the time unit;

using, by at least one computing device, the features to train the machine learning quantity forecasting model for the current level, the transacted item, and the time unit to generate a trained machine learning quantity forecasting model for the current level, the transacted item, and the time unit, including using a training dataset to tune hyper-parameters for the machine learning quantity forecasting model;

identifying multiple machine learning transaction date prediction models, wherein the multiple machine learning transaction date prediction models include at least one compressed model configured to use compressed training data;

generating uncompressed training data;

generating, by the at least one computing device and from the uncompressed training data, compressed training data for the at least one compressed model, including compressing patterns of multiple zero elements followed by a non-zero element into a single value;

training, using the at least one computing device, each of the multiple machine learning transaction date prediction models using the compressed training data determined from transaction data for the current level;

identifying, by each respective machine learning transaction date prediction model, predicted transaction dates in the time unit predicted for the current level;

comparing each of the multiple machine learning transaction date prediction models based on prediction accuracy data generated from testing data determined from the transaction data for the current level, wherein the comparing includes decompressing, by the at least one computing device, compressed results from compressed models before the comparing;

selecting a best machine learning transaction date prediction model for the current level based on the comparison of all of the multiple machine learning transaction date prediction models, wherein a first best machine learning transaction date prediction model selected for a first level is a different type of machine learning model than a second best machine learning transaction date prediction model selected for a different second level;

training, using the at least one computing device, the best machine learning transaction date prediction model based on both the testing data for the current level and the training data for the current level;

computing values for the features using predicted transaction dates in the time unit generated by the best machine learning transaction date prediction model and the historical transaction data;

using the trained machine learning quantity forecasting model to generate predicted quantity information for the current level for the transacted item for the predicted transaction dates in the time unit;

using the predicted quantity information for the current level for the predicted transaction dates in the time unit to identify updated features to use in an updated machine learning quantity forecasting model for a next time unit of the multiple time units;

determining next pairs of transacted entities and transacted items to use for a next level by determining pairs of transacted entities and transacted items for which at least the threshold number of transactions have not occurred for the current level; and determining, as transaction data to use for the next level, historical transaction data for the next pairs of transacted entities and transacted items for which at least the threshold number of transactions have occurred for the next level;

aggregating, for each transacted item, predicted quantity information for multiple levels into aggregated quantity prediction information; and providing the aggregated quantity prediction information in response to the request.

13. The system of claim 12, where a lowest level of the hierarchy corresponds to a transacted item.

14. The system of claim 13, wherein higher levels of the hierarchy correspond to more general categories of transacted items.

15. The system of claim 12, wherein the aggregated quantity prediction information is aggregated with corresponding predicted transaction dates into an aggregated transaction date and quantity prediction.

16. A computer program product encoded on a non-transitory storage medium, the product comprising non-transitory, computer readable instructions for causing one or more processors to perform operations comprising:

receiving a request to predict transaction quantities for a plurality of transaction entities for a future time period;

identifying historical transaction data for the transaction entities for a plurality of categories of transacted items, wherein the plurality of categories are organized using a hierarchy of levels;

dividing the future time period into a set of multiple time units;

for each respective time unit of the multiple time units:
  iterating over multiple levels of the hierarchy and combinations of transaction entities and transacted items starting at a lowest level, wherein the iterating includes determining, as transaction data to use for the lowest level, historical transaction data from pairs of transacted entities and transacted items for which at least a threshold number of transactions have occurred for the lowest level, and wherein the iterating includes, for each current level in the iteration and for each transacted item:
    identifying features to include in a machine learning quantity forecasting model for the current level, the transacted item, and the time unit;
    building the identified features into the machine learning quantity forecasting model for the current level, the transacted item, and the time unit;
    using, by at least one computing device, the features to train the machine learning quantity forecasting model for the current level, the transacted item, and the time unit to generate a trained machine learning quantity forecasting model for the current level, the transacted item, and the time unit, including using a training dataset to tune hyper-parameters for the machine learning quantity forecasting model;

identifying multiple machine learning transaction date prediction models, wherein the multiple machine learning transaction date prediction models include at least one compressed model configured to use compressed training data;
generating uncompressed training data;
generating, by the at least one computing device and from the uncompressed training data, compressed training data for the at least one compressed model, including compressing patterns of multiple zero elements followed by a non-zero element into a single value;
training, using the at least one computing device, each of the multiple machine learning transaction date prediction models using the compressed training data determined from transaction data for the current level;
identifying, by each respective machine learning transaction date prediction model, predicted transaction dates in the time unit predicted for the current level;
comparing each of the multiple machine learning transaction date prediction models based on prediction accuracy data generated from testing data determined from the transaction data for the current level, wherein the comparing includes decompressing, by the at least one computing device, compressed results from compressed models before the comparing;
selecting a best machine learning transaction date prediction model for the current level based on the comparison of all of the multiple machine learning transaction date prediction models, wherein a first best machine learning transaction date prediction model selected for a first level is a different type of machine learning model than a second best machine learning transaction date prediction model selected for a different second level;
training, using the at least one computing device, the best machine learning transaction date prediction model based on both the testing data for the current level and the training data for the current level;
computing values for the features using predicted transaction dates in the time unit generated by the best machine learning transaction date prediction model and the historical transaction data;
using the trained machine learning quantity forecasting model to generate predicted quantity information for the current level for the transacted item for the predicted transaction dates in the time unit;
using the predicted quantity information for the current level for the predicted transaction dates in the time unit to identify updated features to use in an updated machine learning quantity forecasting model for a next time unit of the multiple time units;
determining next pairs of transacted entities and transacted items to use for a next level by determining pairs of transacted entities and transacted items for which at least the threshold number of transactions have not occurred for the current level; and
determining, as transaction data to use for the next level, historical transaction data for the next pairs of transacted entities and transacted items for which at least the threshold number of transactions have occurred for the next level;
aggregating, for each transacted item, predicted quantity information for multiple levels into aggregated quantity prediction information; and
providing the aggregated quantity prediction information in response to the request.

17. The computer program product of claim 16, where a lowest level of the hierarchy corresponds to a transacted item.

18. The computer program product of claim 17, wherein higher levels of the hierarchy correspond to more general categories of transacted items.

19. The computer program product of claim 16, wherein the aggregated quantity prediction information is aggregated with corresponding predicted transaction dates into an aggregated transaction date and quantity prediction.

\* \* \* \* \*